United States Patent
Tang et al.

(10) Patent No.: US 7,600,039 B2
(45) Date of Patent: Oct. 6, 2009

(54) LABEL-BASED MULTIPLEXING

(75) Inventors: Dah-Lain Almon Tang, Naperville, IL (US); Nelson C. Hung, Long Grove, IL (US); Albert Chen, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 890 days.

(21) Appl. No.: 09/784,722

(22) Filed: Feb. 14, 2001

(65) Prior Publication Data
US 2001/0025321 A1 Sep. 27, 2001

Related U.S. Application Data

(60) Provisional application No. 60/182,880, filed on Feb. 16, 2000.

(51) Int. Cl.
*G06F 15/16* (2006.01)
(52) U.S. Cl. .............. 709/238; 709/242; 370/351; 370/392; 370/397; 370/395.5
(58) Field of Classification Search .......... 370/389, 370/352, 392, 400, 351, 397, 395.5; 709/238, 709/242
See application file for complete search history.

(56) References Cited

U.S. PATENT DOCUMENTS

| 5,526,357 | A | | 6/1996 | Jandrell |
| 5,602,841 | A | | 2/1997 | Lebizay et al. |
| 5,991,300 | A | * | 11/1999 | Tappan ................... 370/392 |
| 6,243,379 | B1 | * | 6/2001 | Veerina et al. ........... 370/389 |
| 6,374,303 | B1 | * | 4/2002 | Armitage et al. ......... 709/242 |
| 6,483,833 | B1 | * | 11/2002 | Jagannath et al. ........ 370/392 |
| 6,501,756 | B1 | * | 12/2002 | Katsube et al. .......... 370/392 |
| 6,512,766 | B2 | * | 1/2003 | Wilford .................. 370/389 |
| 6,584,103 | B1 | * | 6/2003 | Hanaoka et al. .......... 370/389 |
| 6,735,190 | B1 | * | 5/2004 | Chuah et al. ............. 370/352 |

* cited by examiner

*Primary Examiner*—William C Vaughn, Jr.
*Assistant Examiner*—Djenane M Bayard
(74) *Attorney, Agent, or Firm*—Steven A. May (57) ABSTRACT

A communication system adds transport layer protocol independent address labels to data packets. The communication system then routes the data packets based on the address labels rather than routing addresses, such as IP, UDP, and ATM headers, and thus can multiplex and transport data packets that are formatted based on a variety of transport protocols.

21 Claims, 5 Drawing Sheets

| PPP HEADER | UPPER LAYER ROUTING ADDRESS | IP HEADER | DATA | CRC |
|---|---|---|---|---|
| 302 | 304 | 306 | 308 | 310 |

| PPP HEADER | LI | Prot | CIP | DATA | LI | Prot | CIP | DATA | ... | CRC |
|---|---|---|---|---|---|---|---|---|---|---|
| 402 | 404 | 406 | 408 | 410 | 404 | 406 | 408 | 410 | | 412 |

| PPP HEADER | ENCAP LABEL | LI | Prot | ADDRESS LABEL | DATA | LI | Prot | ADDRESS LABEL | DATA | LI | Prot | ... | CRC |
|---|---|---|---|---|---|---|---|---|---|---|---|---|---|
| 502 | 504 | 506 | 508 | 510 | 512 | 506 | 508 | 510 | 512 | 506 | 508 | | 514 |

LABEL-BASED MULTIPLEXING

CROSS-REFERENCE TO RELATED APPLICATION

This application claims priority from provisional application Ser. No. 60/182,880, entitled "LABEL-BASED MULTIPLEXING," filed Feb. 16, 2000, which is commonly owned and incorporated herein by reference in its entirety.

FIELD OF INVENTION

The present invention relates generally to the transmission of data packets, and more particularly to methods of multiplexing data packets for transmission.

BACKGROUND OF THE INVENTION

Capacity is always an issue with respect to the transmission of data packets, such as an Internet Protocol (IP) data packet, over a data network, such as an IP network, particularly when low-speed links, such as T1/E1 lines, are involved. In order to improve capacity, methods have been proposed for multiplexing IP/cUDP/PPP packets and IP/UDP/RTP packets over a link that utilizes a point-to-point protocol (PPP). One proposed method generally involves a node in an IP network receiving multiple IP/cUDP/PPP packets, or multiple IP/UDP/RTP packets. The node generates a Frame Relay frame by multiplexing the multiple packets and wrapping the multiplexed packets with a new transport-layer header, such as a multi-protocol label switching (MPLS) header, that is based on the addresses included in the headers of the received data packets. The multiple packets and new transport-layer header are then combined into a single frame and transmitted to a destination node identified by the new transport-layer header. When the frame is received at the destination node, each of the multiple packets are extracted from the frame and routed to their intended destination based on the IP/cUDP/PPP, or IP/UDP/RTP, header included in the packet.

MPLS provides a link layer independent transport framework for the transmission of IP data packets. Since MPLS is link layer independent, it can run over any one of multiple packet mode links, such as ATM, Frame Relay, Ethernet, and PPP. However, since the format of the addresses in each header depends upon the protocol used by the link layer, the new transport layer heading methods cannot be used to multiplex packets of different protocols over a link. In addition, since the proposed method just multiplexes the multiple data packets and wraps a new header around them, the method fails to take advantage of other capacity saving opportunities presented by the multiplexing of multiple data packets.

Therefore, a need exists for a method for multiplexing packets of different protocols over a link and for achieving additional capacity savings.

DETAILED DESCRIPTION OF THE INVENTION

In order to multiplex packets of different protocols over a link and to achieve additional capacity savings, a communication system adds transport layer protocol independent address labels to data packets. The communication system then routes the data packets based on the address labels rather than routing addresses such as IP addresses and associated headers, and thus can multiplex and transport data packets that are formatted based on a variety of transport protocols.

Figure 1:
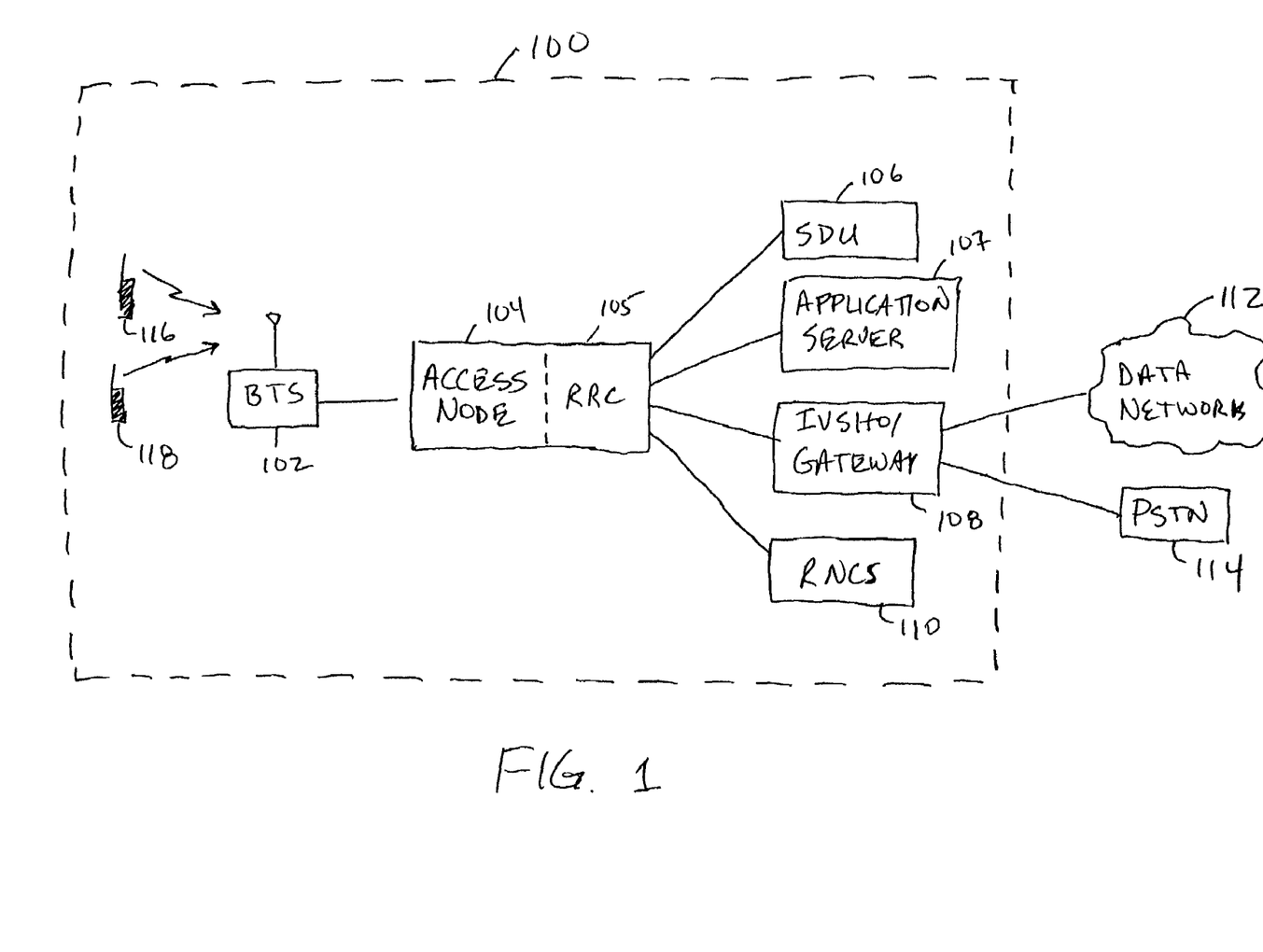
FIG. 1 is a block diagram of a communication system in accordance with an embodiment of the present invention.

The present invention can be more fully understood with reference to FIGS. 1-7. FIG. 1 is a block diagram of a communication system 100 in accordance with an embodiment of the present invention. Communication system 100 includes a base transceiver station (BTS) 102 that is coupled by a high speed link, typically a T1 or a T3 line, to an access node or router 104. Access node 104 is further coupled to each of multiple data processing devices of communication system 100 (four shown), such as a Selection and Distribution Unit (SDU) 106, an application server 107, an Intervendor Soft-Handoff unit/external network gateway (IVSHO/GW) 108, or a Radio Network Control Server (RNCS) 110. Typically, data packets exchanged between access node 104 and each of multiple end units 106, 108 are formatted based on an Internet Protocol (IP). IVSHO/GW 108 is in turn further coupled to one or more networks external to system 100, such as a data network 112, such as an IP network, or a Public Switched Telephone Network (PSTN) 114. Communication system 100 further includes multiple subscriber units 116, 118, (two shown) such as cellular telephones, radio telephones, or wireless data modems coupled to data terminal equipment (DTE), that are in radio frequency (RF) communication with BTS 102.

In one embodiment of the present invention, access node 104 may include a radio network router client (RRC) 105. RRC 105 comprises an IP/Ethernet interface controller that handles routing and mapping of data packets. In another embodiment of the present invention, a radio access network (RAN) relay client is interposed between access node 104 and the multiple end units 106, 108 of system 100. In still another embodiment of the present invention, access node 104 comprises multiple routers that are interposed between BTS 102 and the multiple end units 106, 108 of system 100.

At the level of interconnected network systems, such as system 100, understandings known as protocols have been developed for the exchange of data among the multiple elements of the network. The protocols specify the manner of interpreting each data bit of a data packet exchanged across the network. In order to simplify network designs, several well-known techniques of layering the protocols have been developed. Protocol layering divides the network design into functional layers and then assigns separate protocols to perform each layer's task. By using protocol layering, the protocols are kept simple, each with a few well-defined tasks. The protocols can then be assembled into a useful whole, and individual protocols can be removed or replaced as needed.

Figure 2:
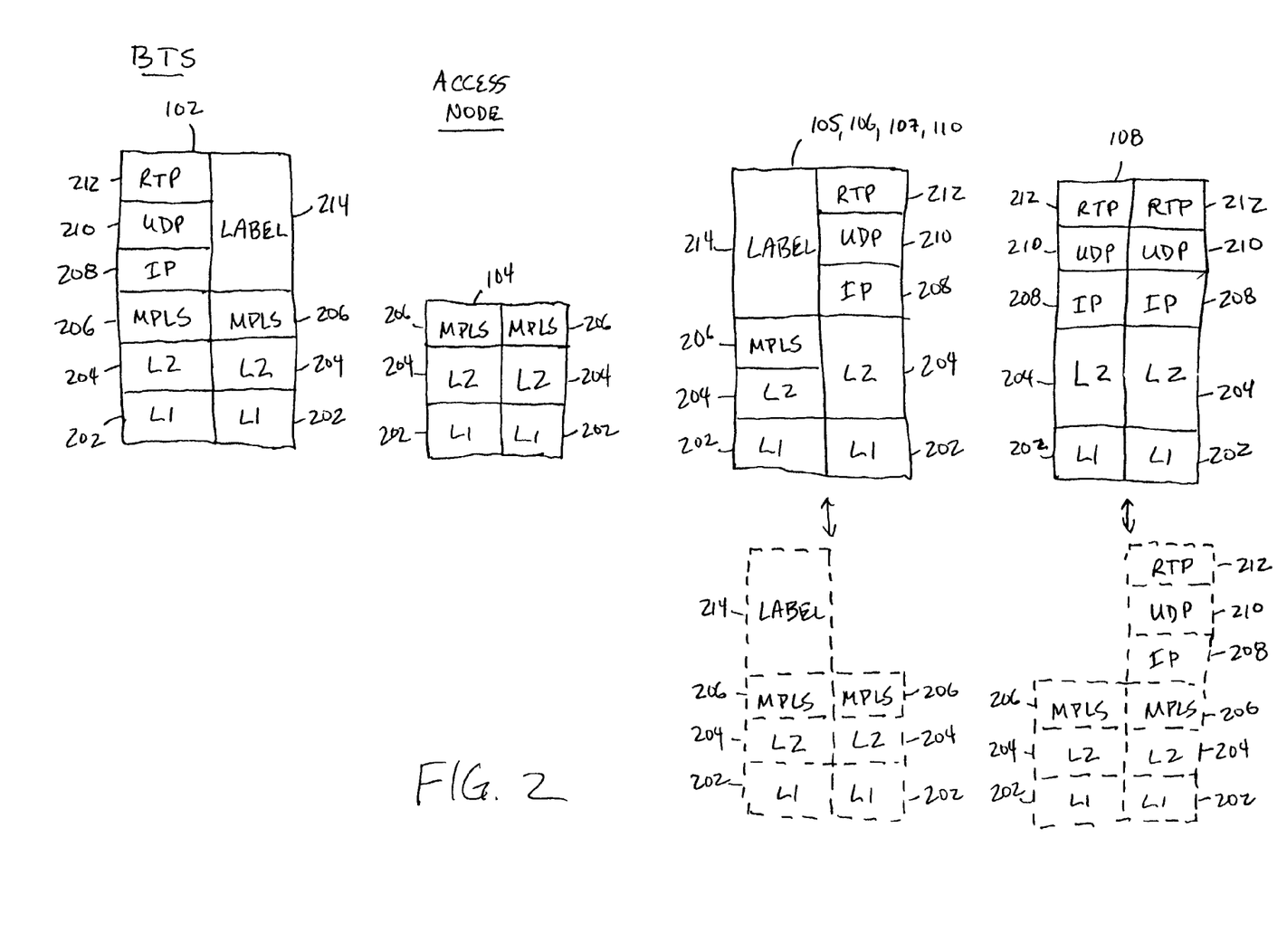
FIG. 2 is block diagram of a protocol layering of the elements of the system of FIG. 1 in accordance with an embodiment of the present invention.

FIG. 2 is block diagram of the protocol layering of the elements 102-110 of system 100 in accordance with an embodiment of the present invention. Layered representation of protocols is commonly known as a protocol stack. One protocol stack commonly used for the interconnection of network systems is IP/UDP, named for two of the protocols, IP and UDP (User Datagram Protocol), in the stack. The IP/UDP protocol stack includes four layers, which layers are, from highest to lowest, an application layer, a transport layer, an internetwork layer, and a network interface and hardware layer.

The bottom layer in the IP/UDP protocol stack, that is, the network interface layer, also known as the link layer or data-link layer, provides an interface to network hardware. As depicted in FIG. 2, the network interface layer of system 100 in turn includes three layers, the bottom two layers designated herein as Layer 1 202 and Layer 2 204, and a multi-protocol label switching (MPLS) layer 206. MPLS layer 206 has been proposed by the Internet Engineering Task Force (IETF) for the purpose of switching data packets with some differentiating features by associating the address labels with packet IP Headers. In essence, MPLS layer 206 includes a tag of 24 bits sitting between a Layer 2 header and a transport layer 208 header. It is only link significant and does not provide multiplexing functions when used with a point-to-point protocol (PPP).

The next layer up from network interface layer 202, 204, 206, that is the internetwork layer 208, or internet layer or network layer, is responsible for delivering data across a series of different physical networks that interconnect a source of the data and a destination for the data. Routing protocols, such as the IP protocol, are included in the internetwork layer, and a message routed from one IP layer to another IP layer is known as an IP data packet, or datagram. An IP data packet includes an IP header containing information for the IP protocol and data for the higher level protocols. Included in the IP header is an IP address for each of a source of the data packet and a destination of the data packet, which source and destination may be any of components 102, 106, 108, and 110 of system 100 or an address associated with external networks 112, 114. An IP address uniquely identifies an interface that is capable of sending and receiving an IP data packet and is described in detail in Request For Comments (RFC) 1166, a publication of the IETF.

The next layer up from the internetwork layer is the transport layer 210. Transport layer 210 provides end-to-end data flow management across system 100, such as connection rendezvous and flow control. Typically, transport layer 210 includes one of two transport protocols, TCP (Transmission Control Protocol) or UDP, that each provides a mechanism for delivering an IP datagram, to a specified port. TCP is an Internet standard protocol with a standard (STD) number 7 and is described in detail in RFC 793. UDP is an Internet standard protocol with an STD number 6 and is described in detail in RFC 768. A system using the UDP protocol to deliver an IP datagram includes a UDP address in the datagram, which address includes an IP address and a port number, and a UDP header that further includes a source port number, a destination port number, a length of data packet number, and a checksum. Above transport layer 210 is the application layer 212, which layer contains protocols that implement user-level applications, such as file transfer and mail delivery.

In order to multiplex packets of different protocols over a link and to achieve capacity savings, system 100 substitutes an address label protocol for an internetwork layer protocol and a transport layer protocol of an incoming data packet. That is, system 100 substitutes an address label for a routing address, such as an IP/UDP header or an IP/cUDP (compressed UDP) header, of the incoming packet. System 100 multiplexes multiple data packets with the substituted address labels, instead of or in addition to the routing addresses, and then adds a PPP header, or also an MPLS header, to the multiplexed data packet for a forwarding of the packet. System 100 further creates a connection table, preferably a look-up table, that includes the address label and the associated transport layer protocol and internetwork layer protocol routing address, and distributes the connection table to elements of the system that may be involved in the routing of the packet. Each element of system 100 receiving the connection table stores the table in a memory included in the element and references the connection table in order to properly route a received data packet based on the packet's address label.

Figure 3:
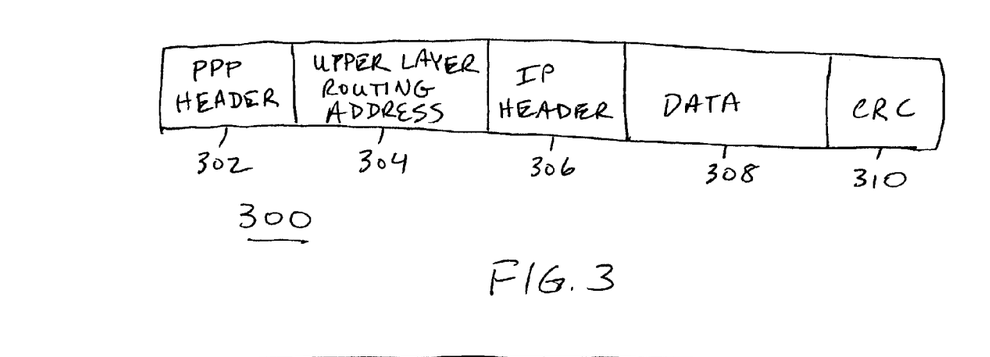
FIG. 3 is a block diagram of an exemplary Frame Relay data packet.

Since the address labels are independent of the transport layer and internetwork layer protocols, the use of address labels permits the multiplexing of data packets that utilize different transport layer and internetwork layer protocols. Furthermore, by substituting an address label for a routing address in each multiplexed data packet, which address label is of a shorter length than the replaced routing address, system 100 achieves capacity savings. For example, and merely for the purpose of illustrating the principles of the present invention, FIG. 3 depicts an exemplary Frame Relay data packet 300 for a PPP transmission, which packet includes an IP header. Frame Relay data packet 300 includes the following data fields: a PPP header 302 that is typically three to five bytes in length, an upper layer routing address 304 that is typically three or four bytes in length, an IP header 306 that is typically of a length greater than 28 bytes and may be as long as 40 bytes, a user information field 308, and a parity bit field 310 for error detection, such as a cyclic redundancy code (CRC), that is typically two bytes in length.

Figure 4:
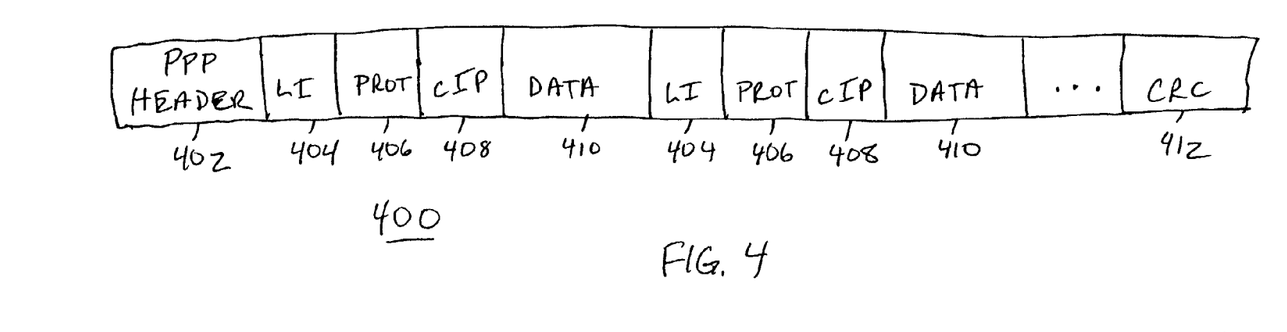
FIG. 4 is a block diagram of an exemplary Frame Relay frame.

FIG. 4 is a block diagram of an exemplary Frame Relay frame 400 for a PPP transmission of an IP/cUDP packet. Frame Relay frame 400 includes multiple data packets that have been multiplexed into a single frame for a PPP transmission. Frame Relay frame 400 includes the following data fields: a PPP header 402 that is typically three to five bytes in length, multiple MPLS packets that each comprise a packet Length Indicator (LI) 404 that is typically one byte, a packet protocol field 406 that is typically 2 bytes in length, a packet destination address 408, such as a compressed IP header or IP/compressed UDP (cUDP) header, that typically is two to six bytes, and a user information field. Frame Relay frame 400 further includes a parity bit field 412 for error detection, such as a cyclic redundancy code (CRC), that is typically two bytes in length.

Figure 5:
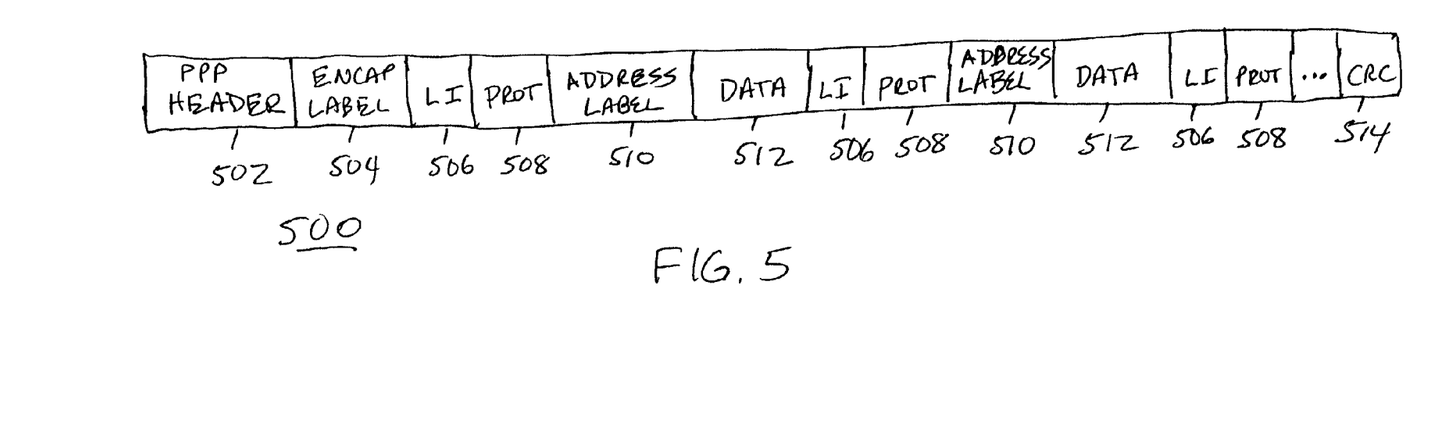
FIG. 5 is a block diagram of an exemplary Frame Relay frame in accordance with an embodiment of the present invention.

In order to multiplex packets of different protocols over a link and to achieve additional capacity savings, communication system 100 replaces routing addresses, such as the IP and cUDP headers of data packet 300 and frame 400, with address labels that are independent of the transport and internetwork layer protocols of data packet 300 and frame 400. FIG. 5 is a block diagram of an exemplary Frame Relay frame 500 for a PPP transmission in accordance with an embodiment of the present invention. In Frame Relay frame 500, the compressed IP header or IP/cUDP header 408 (two to six bytes) in each multiplexed MPLS packet may be replaced by an address label 510 that is one to two bytes in length. Alternatively, address label 510 may be added to the header of each packet while also retaining the compressed IP header or IP/cUDP header 408. In another embodiment of the present invention, involving an IP/TCP packet, address label 510 may be added to, or may be used to replace, an IP/TCP header providing a destination address of the packet.

By adding an address label 510 to each multiplexed data packet, communication system 100 can transport data packets that are formatted based on a variety of transport protocols. In addition, by replacing header 408 with address label 510 for each multiplexed packet, the overhead of the multiplexed frame is reduced, allowing for an increase in system capacity and a savings in system bandwidth. The size of the address label is preferably to be configurable depending on the size of the system utilizing the address labels. Preferably, 4096 address labels should suffice with respect to each BTS 102 in communication system 100, which can be achieved by a use of an address label field 510 of 12 bits or by a translation of each address label 510 in conjunction with encapsulated label 504. However, those who are of ordinary skill in the art realize that a size of an address label 510 may be varied based on system requirements without departing from the spirit and scope of the present invention.

As depicted in FIG. 5, Frame Relay frame 500 includes an MPLS header that includes PPP header 502, typically three to five bytes in length, an encapsulated label 504 that is typically zero to four bytes in length, and a Length Indicator (LI) 506 that is typically one byte in length. Frame Relay frame 500 further includes multiple data packets that each include a packet protocol field 508 that is typically 2 bytes in length, an address label 510 that typically is one to two bytes in length, and a user information field 512. Frame Relay frame 500 further includes a parity bit field 514 for error detection, such as a cyclic redundancy code (CRC), that is typically two bytes in length.

Length Indicator 506 of each multiplexed data packet contains a value of the length of address label field 510 and data field 512. Address label 510 is used as an identifier for user information and some of its characteristics, not just IP and UDP headers. IP/UDP header information is contained in connection tables within end units such as BTS/SDU and/or routers to map the address labels to IP headers. Thus, system 100 does not require IP headers to be compressed/decompressed. In addition, by replacing protocol specific destination addresses, such as IP/cUDP headers or IP/UDP headers, with an address label 510, system 100 is capable of multiplexing packets of different protocols over a PPP connection.

The address label-based multiplexing PPP obtains a multiplexing gain of from four bits to 4½ bytes for each data packet multiplexed into frame 500. As explained above, address label 510 may be used to multiplex both IP/UDP and IP/cUDP packets. The use of an address label does not require header compression and decompression as is often used for IP/UDP headers and can achieve wire speed transmission. In addition, address labels can be used to multiplex fragmented packets for tradeoff between link efficiency and packet delays.

Figure 6:
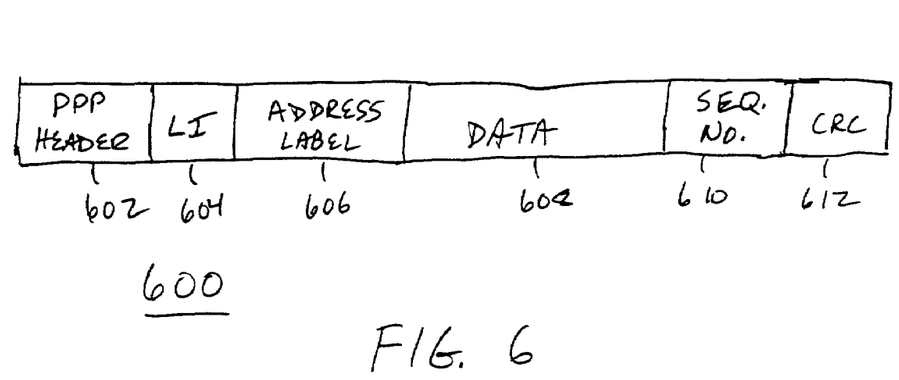
FIG. 6 is a block diagram of an exemplary frame structure for a fragmented packet in accordance with another embodiment of the present invention.

For example, there may be limitations on a maximum size of a PPP frame in order to minimize a delay and delay variation that may happen over a T1 link. In this case, some over sized packets have to be fragmented. When an oversized packet needs to be fragmented, a transmitting communication device, such as BTS 102, adds a sequence number, typically of a length of a byte or ½ of a byte, into the frame to indicate the fragmentation and to facilitate a combining of the fragmented packets by a receiving communication device. FIG. 6 is a block diagram of an exemplary frame structure 600 for a fragmented packet in accordance with another embodiment of the present invention. Similar to the data packets that are multiplexed to produce frame 500, frame structure 600 for a fragmented packet includes the following data fields: a PPP Header 602, typically three to five bytes in length, a packet fragment length identifier 604, typically one byte in length, an address label 606 of 12 bits, a user information field 608, and a parity bit field 612, or error detection field, of typically 2 bytes. However, unlike the data packets included in frame 500, the fragmented data packet of frame 600 further includes a sequence identifier, or number, 610 of four bits. Similar to the data packets depicted in the multiplexed frame of FIG. 5, address label 606 of frame 600 replaces a much lengthier destination address such as an IP/UDP header.

In addition, address label-based multiplexing can further be used to multiplex ATM data packets over communication system 100. The overhead of carrying data over ATM/AAL2 is 3 bytes of AAL2 header for each data packet and 6 bytes of ATM header for every 47 bytes of multiplexed packets. In addition, the fixed length of 53 bytes for a cell can produce greater number of cells than that of PPP frames and further reduces the backhaul capacity.

Figure 7:
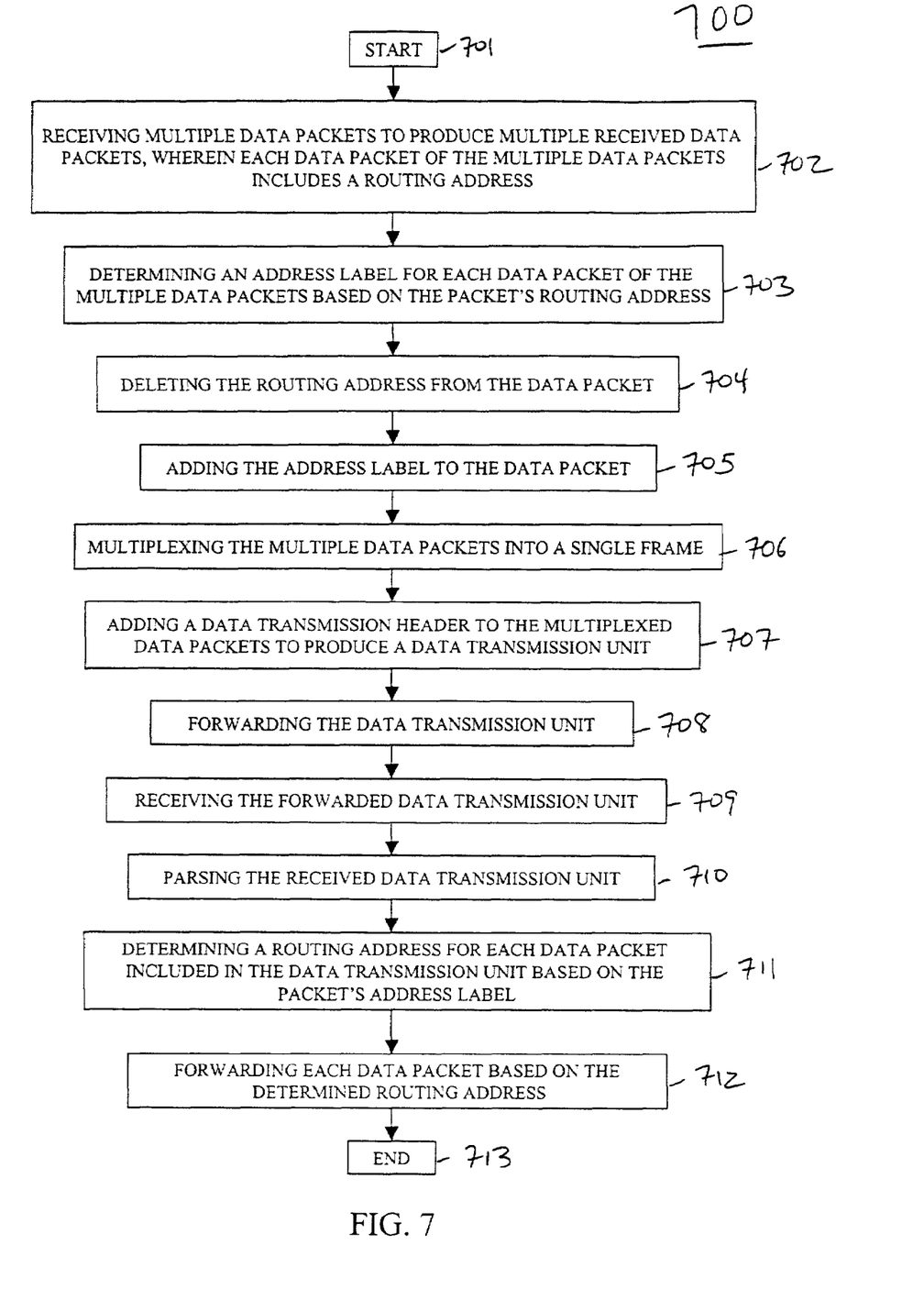
FIG. 7 is a logic flow diagram of address label-based multiplexing steps performed by a communication system in accordance with an embodiment of the present invention.

FIG. 7 is a logic flow diagram 700 of steps performed by communication system 100 in address label-based transmission of multiplexed data packets in accordance with an embodiment of the present invention. The logic flow begins (701) when the communication system receives (702) multiple data packets to produce multiple received data packets, wherein each data packet of the multiple data packets includes a routing address, such as an IP/cUDP header or an IP/UDP header. The communication system then determines (703) an address label of each received data packet based on the data packet's routing address.

Preferably, an address label 510, 606 is internally (to communication system 100) assigned to a routing address by RNCS 110 during a setup of a call with respect to a subscriber unit 116, 118. When assigning an address label, RNCS 110 generates a connection table, preferably a look-up table. The connection table includes the address label and corresponding routing addresses, such as the IP and UDP addresses. RNCS 110 then distributes the connection table to each element 104-108 involved in the routing of the data packet. Each element receiving the connection table stores the connection table in a memory that is included in the element. RNCS 110 also updates the address label and the connection table during the call or whenever else the need arises. An address label 510, 606 can also be changed any time during of the call.

In one embodiment of the present invention, the connection table is distributed during call set up by RNCS 110 to each of one or more data transmitting devices and one or more data receiving devices. For example, when a data packet flows upstream in system 100, BTS 102 may be a data transmitting device and one or more of access node 104, SDU 106, application server 107, and IVSHO/GW 108 may each be a data receiving device. By way of another example, when a data packet flows downstream in system 100, SDU 106, application server 107, or IVSHO/GW 108 may be a data transmitting device and one or more of access node 104 and BTS 102 may be a data receiving device.

RNCS 110 determines a mapping between the address label 510 and the routing address 408, such as an IP/UDP header, that is being replaced by the address label. RNCS 110 then generates a connection table, preferably a look-up table, that includes address label 510 and a corresponding routing address 408. RNCS 110 distributes the connection table to each of the elements included in the path of the data packet through system 100. Each of the elements receiving a connection table stores the table in a memory included in the element and uses the table to route subsequently received data packets. In another embodiment of the present invention, a connection table may include multiple address labels and each label's corresponding routing address and RNCS 110 may distribute the connection table to all of the system elements pertaining to the various data packet routes included in the connection table, or to all of the elements of system 100. In yet another embodiment of the present invention, each network element 104-108 along a data packet route constructs the element's own connection table that records how received packets including a particular address label are to be routed based on instructions from RNCS 110.

In still another embodiment of the present invention, the address labels and corresponding routing addresses may be preassigned and the connection table predetermined. The connection table may then be distributed among the elements of system 100 during system setup. Even when the connection table is predetermined, it RNCS 110 may still dynamically reassign address labels during the operation of system 100. In still another embodiment of the present invention, a data transmitting device, such as BTS 102, may assign one or more address labels to corresponding routing addresses during operation of system 100 or as data packets are received by the BTS. The BTS then generates connection tables that include the assigned address labels and corresponding routing addresses and forwards the connection tables to upstream elements of system 100.

The connection tables can be of a limited life, expiring after a certain amount of time after which new tables need to be distributed. Alternatively, after being distributed, the connection tables may be of an indefinite life, subject to updating by system 100 and remaining valid until replaced by new connection tables.

An exemplary connection table for RNCS 110 may include multiple address labels for system 100 and corresponding IP and UDP headers, channel addresses, quality of service (QoS) metrics, and data source identifiers. Preferably the RNCS 110 connection table contains all entries of all connection tables. The path between RNCS 110 and access node 104 may be address label switched. An exemplary connection table for a data transmitting device, for example BTS 102, that receives an incoming packet from an external data source, such as subscriber units 116 and 118, may include an address label, channel addresses, and QoS metrics. An exemplary connection table for a data receiving device, for example access node 104, SDU 106, application server 107, and IVSHO gateway 108, that receives an address label-based packet from a data transmitting source, may include an address label and corresponding IP and UDP headers and QoS metrics.

The assignment of system elements involved in the forwarding of a data packet, such as access node 104 and SDU 106, is all captured in the address label. A data transmitting device, such as BTS 102, receives multiple data packets from one or more data packet sources, such as subscriber units 116, 118. Alternatively, a data packet source may be a network 112, 114 external to communication system 100, in which case the data transmitting device may be the IVSHO gateway 108 receiving the data packets from the external network. When a data transmitting device, that is, BTS 102, receives a data packet for forwarding, the data transmitting device deletes (704) the incoming data packet's routing address, such as the IP and cUDP or cRTP headers, from the packet and adds (705) an address label to the packet. Alternatively, the data transmitting device, that is, BTS 102, may add (705) an address label without any other processing of the header, that is, without executing the step of deleing (704) the routing address. The address label corresponds to the packet's routing address and is based on the connection table stored in BTS 102. The look-up function performed by the data transmitting device, and data receiving devices as well, can be implemented in hardware to achieve almost wire speed delivery. When BTS 102 has received multiple packets that are each intended for a common node, such access node 104, BTS 102 multiplexes (706) the multiple packets into a single frame, preferably a Frame Relay frame such as frame 400. BTS 102 wraps (707) the multiplexed packets with a data transmission header, such as a PPP header and preferably an MPLS header, that corresponds to the common node to produce a data transmission unit, that is, a data frame. BTS 102 then forwards (708) the frame to a data receiving device, such as access node 104.

A data receiving device, such as access node 104, receives (709) the frame from the data transmitting device, that is, BTS 102. The data receiving device parses (710) the frame and, by reference to the connection table stored in the data receiving device and based on an address label of each packet, determines (711) a routing address for each packet. The data receiving device then forwards (712) each data packet based on the determined routing address, and the logic flow ends (713). Alternatively, if access node 104 is also an address label-based switching router, it can use the address label to forward the packets without referencing the routing address. The router may leave the address label of each packet intact and may multiplex multiple data packets into new frames based on the address label of each packet. In other embodiments of the present invention, communication system 100 may just execute steps (702)-(706), (702)-(707), or (702)-(708), including or alternatively not including step (704), of logic flow diagram 700, or may execute steps (709)-(712) of the logic flow diagram.

When the data receiving device is a target device of system 100, such as SDU 106 or IVSHO gateway 108, the data receiving device strips off an address label of each received data packet and routes the data packet pursuant to the routing information included in the element's connection table. The target device may or may not add the corresponding routing address to the data packet, depending upon the further required processing of the data packet. When a target element is external to system 100, a system 110 gateway to the network, such as IVSHO gateway 108, adds routing address to each data packet by reference to the stored connection table and routes the data packet to the appropriate network.

When a target element in system 100, such as SDU 106, receives a frame that includes the data packet, the target system element extracts each multiplexed data packet from the received frame, strips off an address label of each received data packet, and routes the data packet pursuant to the routing information included in the element's connection table. When a target element is external to system 100, such as a node coupled to one of networks 112 or 114, a system gateway to the network, such as IVSHO gateway 108, adds a routing address to each data packet, preferably the routing address removed by BTS 102, and routes the data packet to the appropriate network.

By replacing routing address with address labels, system 100 transports data packets based on an address label, without using IP headers. The connection tables that are required along the path to forward data packets are thus address label-based, instead of IP header-based. The connection tables are used along the path to forward packets, rather than routing tables. Packets are processed by examining the address labels, not various fields in the IP headers. This allows routers and switches, such as access node 104, to achieve wire speed in forwarding address labeled packets. Furthermore, the address label can be used to identify not only the path, the packet treatment such as fragmentation, but the user and user connection sessions. Preferably, all address labels are managed by RNCS 110. Normal address label changes start from the entries in the target unit and then work its way back to the sending unit.

In another embodiment of the present invention, an address label can also be used to exchange packets over various RAN's via an IVSHO gateway, or Label Edge Router (LER). For example, system 100 may be a RAN that is coupled to other RAN's by IVSHO gateway 108. The address labels used by a LER, such as IVSHO gateway 108, can be obtained from a common database that is accessible by all neighboring RAN gateways and are different from the address labels used within each RAN. An entry for this address label translation is needed at gateways for those involved in IVSHO. The LER's do not have to be address label switches. A requesting RNCS, such as RNCS 110, can put the meaning of the address label into a LER associated with the RNCS and database for routing to other RANs. It is not required for the RAN to be address label-based to use this technology for IVSHO. When receiving a address labeled packet, the LER looks up the associated information and can forward the packet using any technology. On low-speed links, the RNCS can choose to multiplex address labeled packets over PPP by method proposed above.

In sum, a communication system 100 is provided that multiplexes and routes data packet based on address labels. The communication system 100 receives multiple data packets from one or more data packets sources, such as a subscriber unit 116, 118, or an external network, 112, 114, and adds a transport layer protocol independent address label that is based on a routing address for the data packet. The address label corresponding to the routing address is determined by the communication system 100 with reference to a connection table that may be generated when a call is set up, may be generated as data packets are received, or may be based on labels that are preassigned to the routing addresses. The data packet is then multiplexed with other data packets and routed from node to node in system 100 based on the data packet's address label. By adding the transport layer protocol independent address label, communication system 100 is able to multiplex data packets of different transport layer protocols in a single Frame Relay frame. Furthermore, communication system 100 may also replace the routing address with the shorter address label, thereby achieving system capacity savings.

What is claimed is:

1. A method for multiplexing data packets comprising steps of:
   receiving a plurality of data packets to produce a plurality of received data packets, wherein each received data packet of the plurality of received data packets comprises a routing address that is associated with one or more of network layer routing information and transport layer routing information;
   determining an address label for each received data packet based on the data packet's routing address, wherein the address label provides one or more of network layer routing information and transport layer routing information;
   for each data packet of the plurality of received data packets, deleting the routing address from the data packet and adding the address label determined for the data packet to the data packet to produce a modified data packet;
   multiplexing the modified data packets; and
   wrapping the multiplexed data packets with a new data transmission header comprising link layer routing information for the multiplexed data packets to produce a data transmission unit.

2. The method of claim 1, wherein the data transmission header comprises a transport layer header.

3. The method of claim 1, wherein the new data transmission header comprises a multi-protocol address label switching (MPLS) header.

4. The method of claim 1, further comprising a step of routing the multiplexed data packets based on the added data transmission header.

5. The method of claim 1, wherein a received data packet of the plurality of received data packets is formatted based on a different network layer or transport layer data transmission protocol than another received data packet of the plurality of received data packets.

6. The method of claim 1, further comprising a step of creating a connection table that comprises the routing address of each received data packet and the address label corresponding to each routing address.

7. A method for point-to-point transmission of data comprising steps of:
   receiving, by a data transmitting device, a plurality of data packets to produce a plurality of received data packets, wherein each received data packet of the plurality of received data packets comprises a routing address that is associated with one or more of network layer routing information and transport layer routing information;
   determining, by the data transmitting device, an address label for each received data packet based on the data packet's routing address, wherein the address label provides one or more of network layer routing information and transport layer routing information;
   for each data packet of the plurality of received data packets, deleting, by the data transmitting device, the data packet's routing address from the data packet and adding, by the data transmitting device, the address label determined for the data packet to the data packet to produce a modified data packet;
   multiplexing, by the data transmitting device, the modified data packets;
   adding, by the data transmitting device, a data transmission header to the multiplexed data packets that includes link layer routing information for the multiplexed data packets to produce a data transmission unit; and
   transmitting, by the data transmitting device, the data transmission unit to a data receiving device.

8. The method of claim 7, further comprising steps of:
   receiving the data transmission unit by the data receiving device;
   extracting, by the data receiving device, the modified data packets from the data transmission unit; and
   routing, by the data receiving device, each modified data packet based on the routing address corresponding to the data packet's address label.

9. The method of claim 8, further comprising steps of:
   deleting, by the data receiving device, the address label from each modified data packet; and
   adding, by the data receiving device to each modified data packet, the routing address corresponding to the modified data packet's address label.

10. The method of claim 7, further comprising a step of creating a connection table that comprises the routing address of each received data packet and the address label corresponding to each routing address.

11. The method of claim 10, wherein the connection table is created by the data transmitting device and conveyed by the data transmitting device to the data receiving device.

12. The method of claim 10, wherein the step of routing each modified data packet comprises a step of routing, by the data receiving device, each modified data packet by reference to the connection table.

13. The method of claim 7, wherein a received data packet of the plurality of received data packets is formatted based on a different network layer or transport layer data transmission protocol than another received data packet of the plurality of received data packets.

14. The method of claim 7, further comprising steps of:
receiving a data transmission unit;
determining a routing address of each modified data packet included in the data transmission unit based on the modified data packet's address label; and
forwarding each modified data packet based on the determined routing address.

15. A data transmitting device for transmitting multiplexed data packets, the data transmitting device comprising:
a receiving unit that receives a plurality of data packets to produce a plurality of received data packets, wherein each received data packet of the plurality of received data packets comprises a routing address that is associated with one or more of network layer routing information and transport layer routing information;
a processor coupled to the data receiving unit that determines an address label for each received data packet based on the data packet's routing address, wherein the address label provides one or more of network layer routing information and transport layer routing information, for each received data packet, deletes the data packet's routing address from the data packet and adds the address label determined for the data packet to the data packet to produce a modified data packet, multiplexes the modified data packets, and wraps the multiplexed data packets with a new data transmission header comprising link layer routing information for the multiplexed data packets to produce a data transmission unit; and
a transmitting unit coupled to the processor that transmits the data transmission unit.

16. The data transmission device of claim 15, wherein the processor further determines a data transmission header for the multiplexed data packets and adds the data transmission header to the multiplexed data packets.

17. The data transmission device of claim 15, wherein the processor further creates a connection table that comprises the routing address of each received data packet and the address label corresponding to each routing address.

18. The data transmission device of claim 17, wherein the transmitting unit transmits the connection table to a data receiving device.

19. A data receiving device for receiving a data transmission unit comprising a plurality of multiplexed data packets, the data receiving device comprising:
a receiving unit that receives the data transmission unit based on a link layer data transmission header that wraps the multiplexed data packets, wherein each data packet of the multiplexed data packets comprises an address label that provides one or more of network layer routing information and transport layer routing information; and
a processor coupled to the receiving unit that extracts a plurality of data packets from the data transmission unit, determines one or more of a network layer and a transport layer routing address for each data packet of the plurality of data packets based on the address label, deletes the address label from and adds the determined one or more of a network layer and a transport layer routing address to each data packet of the plurality of data packets, and routes each data packet based on the data packet's determined routing address.

20. The data receiving device of claim 19, further comprising a memory coupled to the processor that stores a connection table comprising at least one address label and a routing address corresponding to the at least one address label, and wherein the processor determines a routing address for each data packet by reference to the connection table.

21. The data receiving device of claim 19, wherein the data transmission unit further comprises a data transmission header corresponding to the data receiving device.

* * * * *